No. 762,221. PATENTED JUNE 7, 1904.
W. J. WRIGHT.
REVERSING CLUTCH MECHANISM.
APPLICATION FILED JUNE 30, 1903. RENEWED FEB. 15, 1904.
NO MODEL. 2 SHEETS—SHEET 1.
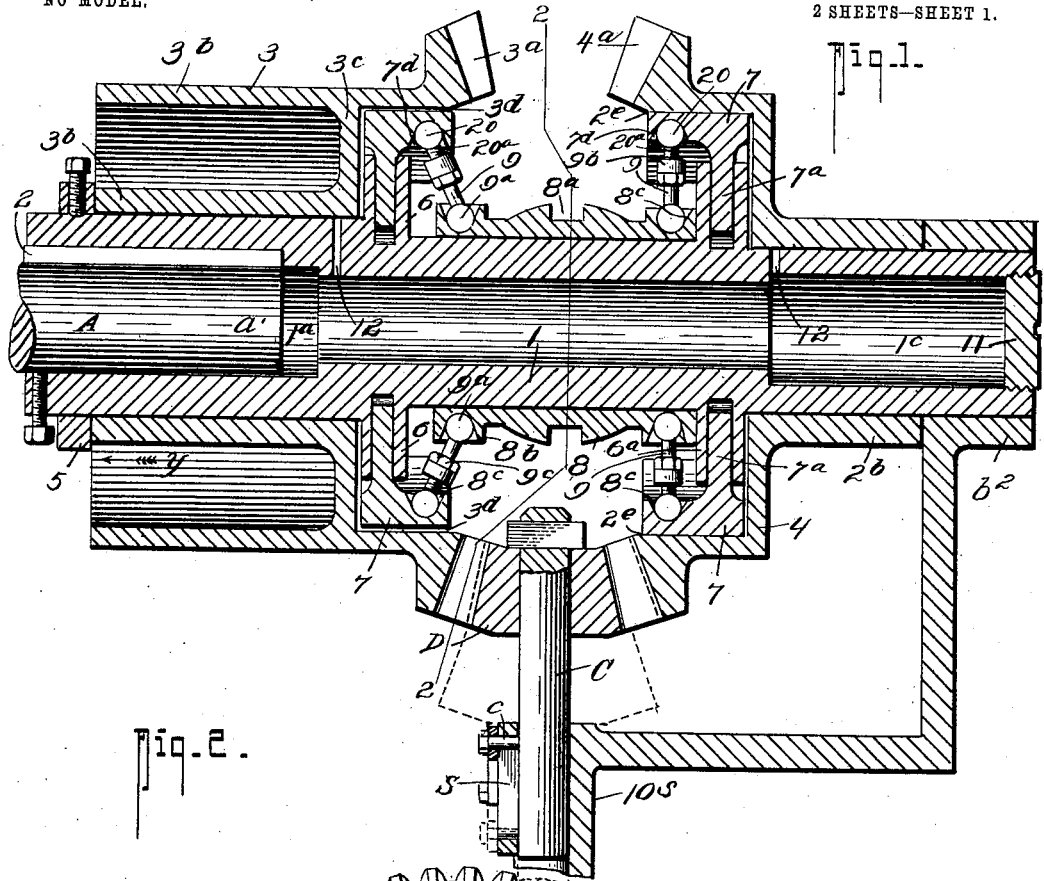
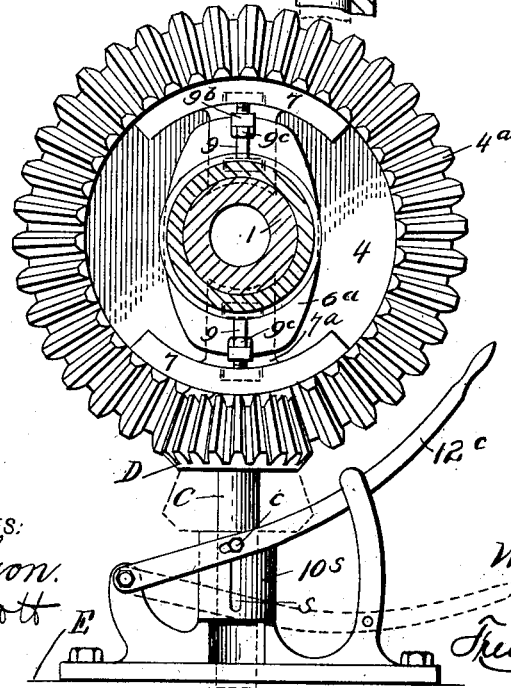
WITNESSES:
F. C. Gibson.
John T. Schrott.
INVENTOR
William J. Wright
BY
Fred G. Dieterich
ATTORNEYS No. 762,221. PATENTED JUNE 7, 1904.
W. J. WRIGHT.
REVERSING CLUTCH MECHANISM.
APPLICATION FILED JUNE 30, 1903. RENEWED FEB. 15, 1904.
NO MODEL. 2 SHEETS—SHEET 2.
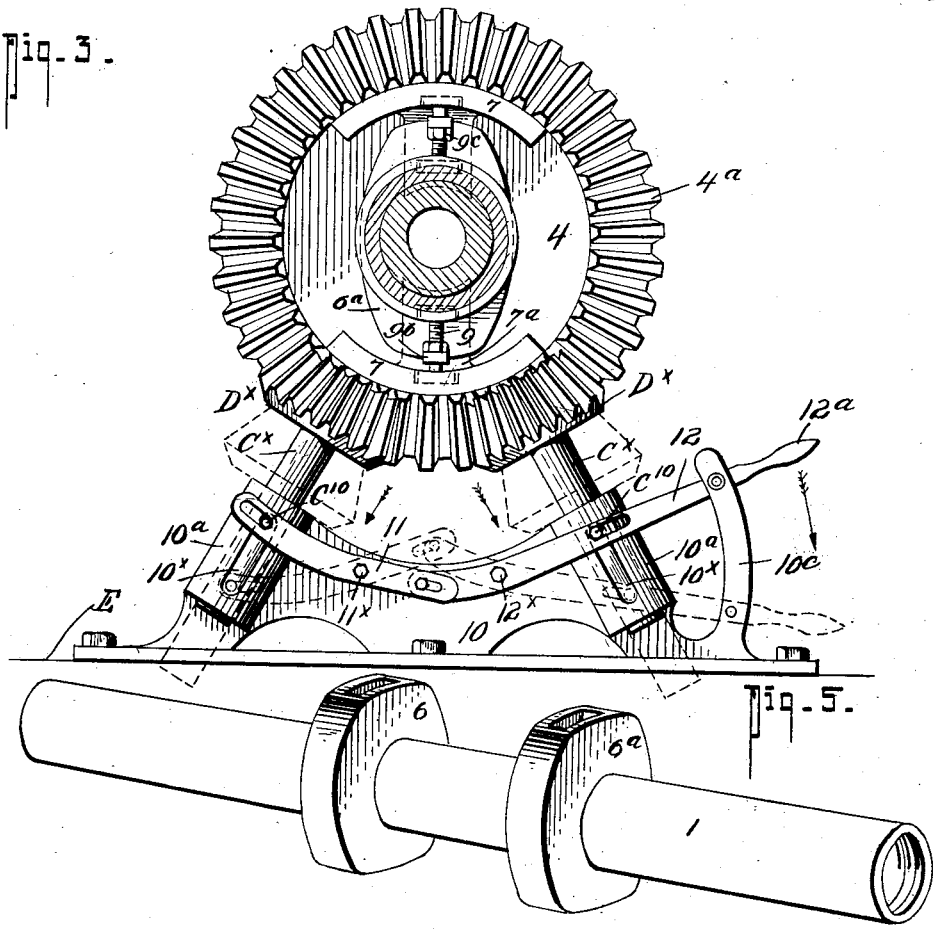
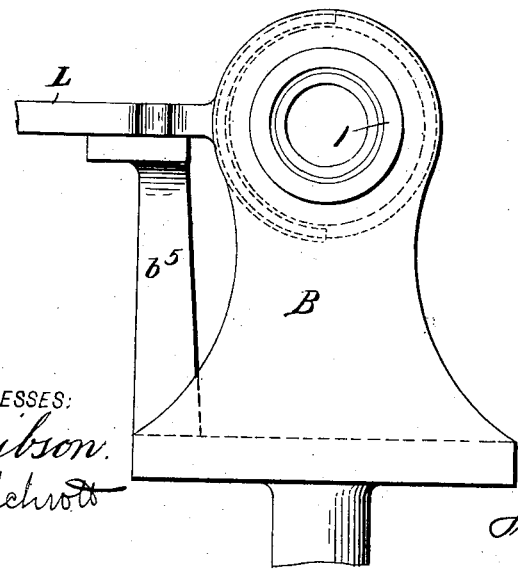
WITNESSES:
F. C. Gibson
John T. Schrott
INVENTOR
William J. Wright.
BY
Fred G. Dieterich & Co.
ATTORNEYS No. 762,221.

Patented June 7, 1904.

UNITED STATES PATENT OFFICE.

WILLIAM J. WRIGHT, OF PITTSBURG, PENNSYLVANIA, ASSIGNOR, BY DIRECT AND MESNE ASSIGNMENTS, TO THE WRIGHT REVERSE COMPANY, OF PITTSBURG, PENNSYLVANIA, A CORPORATION OF WEST VIRGINIA.

REVERSING CLUTCH MECHANISM.

SPECIFICATION forming part of Letters Patent No. 762,221, dated June 7, 1904.

Original application filed May 11, 1903, Serial No. 156,691. Divided and this application filed June 30, 1903. Renewed February 15, 1904. Serial No. 193,740. (No model.)

*To all whom it may concern:*

Be it known that I, WILLIAM J. WRIGHT, residing at Pittsburg, in the county of Allegheny and State of Pennsylvania, have invented a new and Improved Reversing Clutch Mechanism, of which the following is a specification.

My present invention comprehends certain new and useful improvements in reversing clutch mechanisms, and more especially refers to the gearing devices which form a part of the complete construction of clutch mechanism disclosed in my copending application filed May 11, 1903, Serial No. 156,691, of which this application forms a divisional part.

In the present case my invention in its generic nature embodies a peculiar correlation of a shifting-gear and means for actuating the same, with a reversing means in which is included a pair of oppositely-disposed gear-faced pulleys loosely mounted upon a drive-shaft and means for alternately clutching said pulleys with the shaft to rotate therewith; and in its more subordinate features my present invention embodies certain details of construction and peculiar combination of parts, all of which will hereinafter be fully explained, and pointed out in the appended claims, reference being had to the accompanying drawings, in which—

Figure 1 is a longitudinal section of a reversing clutch mechanism embodying my invention and showing the simplest form thereof. Fig. 2 is a transverse section of the same, taken substantially on the line 2 2 of Fig. 1. Fig. 3 is a cross-section of the same, illustrating a modified and preferred form of my invention. Fig. 4 is a detail end view of an end bearing for the shaft and a clutch-shifting lever hereinafter referred to. Fig. 5 is a detail perspective view of the tubular-shaft member hereinafter referred to.

The clutch mechanism *per se* in my present case is arranged and operates the same as is shown in my other application referred to, and as illustrated in Fig. 1 the same is supported at one end upon the end $a'$ of an engine-shaft A, and at the opposite end it is journaled in a suitable bearing $b^2$, formed on the upper end of a bracket B, mounted upon a supporting beam or base E.

The shaft-section 1 of the clutch mechanism may be and preferably is in the nature of a tubular sleeve one end of which is cored out, as at $1^a$, to receive the end $a'$ of the engine-shaft A, to which it is secured by a key 2, as shown, and when arranged as in Fig. 1 it forms a tubular extension of the said engine-shaft of a length sufficient to receive and support the clutch devices.

The clutch devices comprise a combined belt and clutch pulley 3, mounted on that end of the tubular member 1 connected to the engine-shaft portion $a'$.

4 designates an opposing clutch-pulley mounted on the outer end of the member 1, with its annular or gear rim $4^a$ facing the gear-rim $3^a$ of the pulley 3.

In the simplest form of my present invention a single idler-gear D is shown, which is loosely mounted upon the upper end of a short shaft C, radially adjustable with respect to the tubular member 1 and held within a socket-bearing $10^s$, mounted upon the base E, and the said socket has an elongated slot $s$ in the direction of the length through which passes a stud $c$ of the shaft C, with which engages a shifting-lever $12^c$, pivotally mounted on the base E and having suitable detent devices for holding it to its shifting positions, whereby to sustain the idler-gear D at its operative or inoperative positions. By shiftably mounting the gear D, as stated, the said gear can be readily disengaged from the clutch pulleys or gears 3 and 4 when reversing of the belt is not required, and unnessary wear and noise incident to the use of the idler-gear is thereby avoided.

In Fig. 3 I have illustrated a preferred form of my invention by reference to which it will be noticed a casting 10 is bolted to the beam E, which has a pair of hubs $10^a$, radial with respect to the axis of the tubular member 1, in each of which is slidably mounted a shaft $C^\times$, carrying a gear $D^\times$ for engaging the gear-rims of the clutch-pulleys. Each hub $10^a$ has an elongated slot $10^\times$, and through the said slots extend the studs $c^{10}$ $c^{10}$, projected from the shaft $C^\times$, and the said studs enter the elongated slots in the pivoted levers 11 12, fulcrumed, respectively, on the studs $11^\times$ $12^\times$ and pivotally joined with each other, and one of the said levers has a handle member $12^a$, operating on a curved bracket $10^c$, provided with apertures to receive a key for holding the handle member $12^a$ at its upper or lower position. When at the upper position, (shown in full lines in Fig. 3,) the idler-gears $D^\times$ are held in mesh with the clutch-gears; but when shifted to the dotted position, (shown in Fig. 3,) the said gears $D^\times$ are out of mesh and held from rotation. The gear-pulley 3 has a long hub $3^b$, which extends outward from and merges with the web or disk portion $3^c$, and the said hub $3^b$ engages with a collar 5, fixedly held on the inner end of the sleeve 1, which collar holds the pulley 3 from lateral play on the sleeve 1 in the direction of the arrow $y$, and the said pulley 3, which is loosely mounted on the shaft 1, is also held from loose play in the opposite direction by reason of its portion $3^c$ engaging an adjacent set of clutch-shoe-receiving pockets 6 6, which are integral or fixedly connected with and projected radially from a tubular shaft 1, the peculiar construction of which and the detail combination of the same with the parts that coöperate therewith forming an essential feature of my present invention. By referring now more particularly to Fig. 1, it will be noticed the pulley or gear 3 has an annular clutch-flange $3^d$, that projects over the pockets 6 6 and the shoes 7 7, the latter being radially adjustable in the pockets 6 6, and the end of the flange $3^d$ merges with the gear-rim $3^a$, the teeth of which, as also those of the rim $4^a$ of the opposing pulley 4, are of suitable pitch to properly mesh with the idler-gear D or gears $D^\times$. The clutch-pulley 4 has an outwardly-projecting hub $2^b$, that engages the bracket portion $b^2$, and the said gear is loosely mounted on the sleeve or hollow shaft 1 and held from movement inwardly by having its web disk portion engaging the shoe-pockets $6^a$, which are formed on the shaft member 1 in a manner similar to that of the pockets 6 6, and the said clutch-pulley 4 is also formed with an annular clutch-flange $2^e$, which projects over its coöperating clutch-shoes and their holding-pockets, and the said flange $2^e$ also merges with the gear-rim $4^a$, as shown. The pockets 6 $6^a$ are in the nature of transverse enlargements integral with the sleeve 1, cored out at diametrically opposite points to receive the shanks $7^a$ of the clutch-shoes 7, and the shank-receiving pockets 6 $6^a$ have parallel sides of suitable thickness to properly guide the said clutch-shoe shanks $7^a$ and provide sufficient thickness of metal at the said portions of the sleeve or shaft 1 to withstand the strain that is transmitted directly from the said shaft or sleeve to the loosely-mounted pulleys 3 and 4 through the medium of the clutch-shoes 7. The shanks $7^a$ of each of the clutch-shoes are slidable in the radially-disposed pockets and merge with segmental clutch members $7^b$, the gripping-faces of which are concentric with the clutch-flanges on the pulley-gears 2 and 3, as clearly shown in Fig. 3. That portion of the shaft or sleeve 1 that carries the pockets 6 $6^a$ is thickened to give additional strength to the said portion of the sleeve, and upon the thickened portion is mounted a shiftable clutch-sleeve A, having a central annular groove $8^a$ to receive the bifurcated ends 1 of the clutch-lever L, which is horizontally mounted on a vertical extension $b^5$ of the bracket B, (see Fig. 4,) and the opposite ends of the clutch-sleeve 8 have annular enlargements $8^b$ $8^b$, which at diametrically opposite points have semicircular bearings $8^c$ $8^c$ to accommodate the circular heads $9^a$ $9^a$ of the clutch-links 9 9, which include the adjusting-nuts $9^c$ and coupling-blocks $9^b$, and with the latter of which join the screw-shanks $20^a$ of the heads 20, that engage semicircular sockets $7^d$ $7^d$ in the inner faces of the shoe members, as shown.

The hollow of the sleeve 1 when my mechanism is designed for use, as in Fig. 1, is utilized as a lubricant-holder and can be readily filled for use through the outer end $1^c$, which is normally closed by a screw-plug 11, and the said sleeve 1 also has oil-passages 12 12 to distribute the oil and maintain a sufficient lubrication of the bearing parts, it being understood, however, that, if desired, the said member 1 may be solid and cored at one end only to fit on the end $a'$ of the engine-shaft.

While my present form of clutch mechanism is more especially designed to be attached to the end of an engine-shaft, it is manifest the same can be utilized as a jack-shaft for joining the adjacent ends of two drive-shaft connections, and in the latter arrangement the plug 11 is omitted, and the end $1^c$ of the sleeve is cored out similar to the opposite end, that receives the shaft-section $a'$, (shown in Fig. 1,) and keyed to its respective shaft end in the same manner.

By reason of the peculiar construction of the parts as described and shown a compact, strong, and effectively-operating reversing mechanism is provided in which the operation of reversing can be quickly accomplished without any appreciable torsional or twist strain on the operating parts, and since the connection between the pulleys and the sleeve 1 is made direct through the shoes, having rigid adjustment with respect to the sleeve 1 and interlock therewith from lateral motion and engaging with a reinforced part of the sleeve, a strong connection between the sleeve and the loosely-mounted gear-pulleys is provided without the use of the usual feather connection joining the sliding clutch-sleeve with the tubular sleeve or shaft extension.

While I have illustrated in the application of my present invention that a single or a pair of idler-gears D may be used, it is manifest my invention is not limited to the exact number of gears, as the said number depends upon the conditions required, and while my present form of clutch devices is preferred in the practical construction of my complete clutch mechanism it is manifest the exact details of said clutch mechanism for fixedly connecting the pulleys 3 and 4 to turn with the shaft may be varied or modified without departing from the scope of my invention as expressed in the appended claims.

Having thus described my invention, what I claim, and desire to secure by Letters Patent, is—

1. In a clutch mechanism of the character stated; a shaft-section, a pair of oppositely-disposed pulleys loosely mounted thereon, each having a clutch-flange and an annular gear-rim, an idler-gear for meshing with the opposing gear-rims of the two pulleys and the said gear being shiftably mounted, the means for shifting the idler-gear into or out of an operative connection with the clutch-pulleys, pockets projected radially from and fixedly joined with the shaft-section, a clutch-shoe radially adjustable in each of the said pockets, said shoes being adapted to engage the loosely-mounted pulleys and a shifting and locking means mounted on the shaft for adjusting and holding the said clutch-shoes to their operative or inoperative position.

2. In a clutch mechanism, in combination; a shaft-section, a pair of opposing pulleys mounted loosely thereon, each having an annular clutch-flange and an annular gear-rim, said shaft-section having transverse integral enlargements formed with radially-disposed pockets, clutch-shoes adapted to engage the annular clutch-flanges of the pulleys and having stems radially adjustable in the aforesaid pockets, locking means upon the shaft-section for adjusting and holding the clutch-shoes to their radially-adjusted positions, a pair of radially-projected hubs, an idler-gear-carrying shaft adjustably mounted in each of said hubs, means for shifting said shafts in unison and locking them to their adjusted positions whereby to bring the idler-gears into or out of mesh with the gear-rims on the loosely-mounted pulleys, all being arranged substantially as shown and described.

3. In a clutch mechanism of the character stated, a shaft, a pair of opposing gear-faced pulleys loosely mounted on the shaft, each having a clutching-surface, a clutch mechanism mounted on the shaft common to both pulleys, means for shifting the said mechanism to alternately clutch the said pulleys with the shaft, an idler-gear for meshing with the opposing gear-faces of the two pulleys and a means for shifting the said idler-gear into or out of an operative connection with the said gear-faces of the two opposing pulleys, as set forth.

WILLIAM J. WRIGHT.

Witnesses:
 JAMES W. LEE,
 FRED J. GALLOWAY.